US012748705B2

(12) United States Patent
Jayaram Masti et al.

(10) Patent No.: US 12,748,705 B2
(45) Date of Patent: Sep. 29, 2026

(54) MULTI-CORE PROCESSOR-BASED SYSTEM IMPLEMENTING DIRECTED PAGE TABLE ENTRY INVALIDATION

(71) Applicant: Ampere Computing LLC, Santa Clara, CA (US)

(72) Inventors: Ramya Jayaram Masti, Hillsboro, OR (US); Benjamin Crawford Chaffin, Portland, OR (US); Vincent Edward Von Bokern, Rescue, CA (US); Raymond S. Tetrick, Portland, OR (US)

(73) Assignee: Ampere Computing LLC, Santa Clara, CA (US)

(*) Notice: Subject to any disclaimer, the term of this patent is extended or adjusted under 35 U.S.C. 154(b) by 120 days.

(21) Appl. No.: 18/607,355

(22) Filed: Mar. 15, 2024

(65) Prior Publication Data

US 2025/0291735 A1 Sep. 18, 2025

(51) Int. Cl.

| | |
|---|---|
| ***G06F 12/1009*** | (2016.01) |
| ***G06F 9/455*** | (2018.01) |
| ***G06F 12/1036*** | (2016.01) |

(52) U.S. Cl.

CPC ...... *G06F 12/1009* (2013.01); *G06F 9/45558* (2013.01); *G06F 12/1036* (2013.01); *G06F 2009/45583* (2013.01)

(58) Field of Classification Search

CPC ............. G06F 12/1009; G06F 9/45558; G06F 12/1036; G06F 2009/45583

See application file for complete search history.

(56) References Cited

U.S. PATENT DOCUMENTS

| | | | | |
|---|---|---|---|---|
| 5,101,346 | A * | 3/1992 | Ohtsuki | G06F 15/167 718/100 |
| 7,334,108 | B1 * | 2/2008 | Case | G06F 12/1045 710/26 |
| 2017/0308404 | A1 * | 10/2017 | Deshpande | G06F 9/30087 |
| 2019/0377688 | A1 * | 12/2019 | Basu | G06F 9/542 |
| 2022/0035748 | A1 * | 2/2022 | Campbell | G06F 12/1027 |
| 2023/0064603 | A1 * | 3/2023 | Blasco | G06F 12/0811 |

* cited by examiner

*Primary Examiner* — Sean D Rossiter

(74) *Attorney, Agent, or Firm* — Withrow & Terranova, PLLC

(57) ABSTRACT

A first core in a processor-based system may obtain information that identifies cores in a first set of cores, where the information also indicates that at least one core of the first set of cores is assigned to execute instructions for a first VM. The first core sends a first message directed to the first set of cores to invalidate copies of a first page table entry of the first VM in the core TLBs of the first set of cores. A message to invalidate copies of a page table entry may be sent in advance of modifying the page table entry of the first VM in a memory system. Sending a message directed to the first set of cores to invalidate copies of page table entries in the first set of cores, instead of an invalidation message broadcast to all cores in the processor-based system, reduces communication traffic.

29 Claims, 5 Drawing Sheets

MULTI-CORE PROCESSOR-BASED SYSTEM IMPLEMENTING DIRECTED PAGE TABLE ENTRY INVALIDATION

FIELD OF THE DISCLOSURE

The technology of the disclosure relates to multi-core processors in which multiple cores share an address translation regime and have caches (translation look-aside buffers) for storing page table entries.

BACKGROUND

Processors or processor-based systems in consumer electronics and other devices are capable of rapidly performing multiple applications or tasks in parallel by employing multiple virtual machines (VMs) or contexts. Each of the VMs has its own instruction stream and its own virtual image of memory. One or more VMs may be executed on one or multiple processor cores (cores) of a processor simultaneously, such that multiple VMs in the processor may be accessing the same memory addresses, each using their own virtual memory address for the same physical memory address. To provide data associated with the correct physical memory addresses to each VM, translations between virtual memory addresses and physical memory addresses for each VM are stored in page tables in a memory system. Page table entries in a page table provide translation information for blocks of memory, so the same translation may be used for any address within the same block. These translations may be frequently needed by a VM but accessing the page table in a memory system frequently would cause congestion in a system bus, mesh network, etc. For this reason, cores and/or Central Processing Units (CPUs) may include a cache, known as a translation look-aside buffer (TLB), for storing copies of recently used page table entries where they can be quickly referenced by a core.

During processing, however, one of the VMs may change the virtual address assigned to a physical memory location. In addition, a page table entry may be changed by a hypervisor or VM monitor (VMM) to transition a core from one VM to another. Accordingly, any cores that have previously executed instructions for that VM and have accessed the same block of memory addresses may have, in their TLB, a copy of the page table entry that is no longer correct due to the change. Those incorrect copies need to be marked as invalid to prevent them from being used. In existing processors, page table entries are invalidated by broadcasting a message to every core in a system that shares the same address translation regime, to instruct those cores (or their TLBs) to invalidate the page table entries associated with that particular block of memory. To ensure that this message has been received by every core, every core is expected to send a response back to the originator of the message. As the number of cores in processors continues to increase, congestion caused by the broadcasted invalidation messages and returned acknowledgments on every occasion in which a page table entry is invalidated may create communication bottlenecks on the system buses, mesh networks, etc., that negatively impacts processor performance.

SUMMARY

Aspects disclosed herein include a multi-core processor-based system implementing directed page table entry invalidation. Related methods of directed invalidation of page table entries in a multi-core processor are also disclosed. The processor-based system includes multiple processor cores (cores) that may each include a core translation look-aside buffer (TLB) for storing copies of page table entries used for translating between virtual memory addresses of a virtual machine (VM) and physical memory addresses of a memory system. Each core is allocated to a set of cores. Copies of a same page table entry of a page table in the memory system may be stored in the core TLBs of cores that are assigned to execute at least one instruction of a first VM. In an exemplary aspect, a first core in the processor-based system is configured to obtain information that identifies cores in a first set of cores, where the information also indicates that at least one core of the first set of cores is assigned to execute instructions for the first VM. The first core sends a first message directed to the first set of cores to invalidate copies of a first page table entry of the first VM in the core TLBs of the first set of cores. In some examples, a message to invalidate copies of a page table entry may be sent in advance of modifying the page table entry of the first VM in the memory system. Employing a message directed to the first set of cores to invalidate copies of page table entries stored in the core TLBs of the first set of cores, instead of an invalidation message broadcast to all cores in the processor-based system, reduces communication traffic.

In this regard, in one exemplary aspect, a processor-based system is disclosed. The processor-based system includes a plurality of processor cores (cores) communicatively coupled to each other and configured to couple to a memory system. Each core of the plurality of cores comprises a core translation look-aside buffer (TLB) configured to store copies of page table entries of a virtual machine (VM), and each core of the plurality of cores is allocated to one or more of a plurality of sets of cores comprising a first set of cores and a second set of cores. A first core of the plurality of cores is configured to obtain first information identifying cores in the first set of cores and indicating that at least one core in the first set of cores is assigned to execute instructions of a first VM, and send a first message directed to the first set of cores to invalidate copies of a first page table entry of the first VM in the core TLBs in the first set of cores.

In another exemplary aspect, a method in a processor-based system including a plurality of processor cores (cores) communicatively coupled to each other and configured to couple to a memory system is disclosed. The method includes, storing page table entries of a virtual machine (VM) in a core translation look-aside buffer (TLB) of each core of the plurality of cores, and allocating each core of the plurality of cores to one or more of a plurality of sets of cores, comprising a first set of cores and a second set of cores. The method also includes, in a first core of the plurality of cores, obtaining first information identifying cores in the first set of cores and indicating that at least one core in the first set of cores is assigned to execute instructions of a first VM, and sending a first message directed to the first set of cores to invalidate copies of a first page table entry of the first VM stored in the core TLBs of the first set of cores.

In another exemplary aspect, a non-transitory computer-readable medium is disclosed. The non-transitory computer-readable medium includes instructions which, when executed in a processor-based system including a plurality of processor cores (cores) communicatively coupled to each other and configured to couple to a memory system, control the processor-based system to, store page table entries of a virtual machine (VM) in a core translation look-aside buffer (TLB) of each core of the plurality of cores, allocate each core of the plurality of cores to one or more of a plurality of sets of cores, comprising a first set of cores and a second set of cores and, in a first core of the plurality of cores, obtain first information identifying cores in the first set of cores and indicating that at least one core in the first set of cores is assigned to execute instructions of a first VM, and send a first message directed to the first set of cores to invalidate copies of a first page table entry of the first VM stored in the core TLBs of the first set of cores.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

Figure 4:
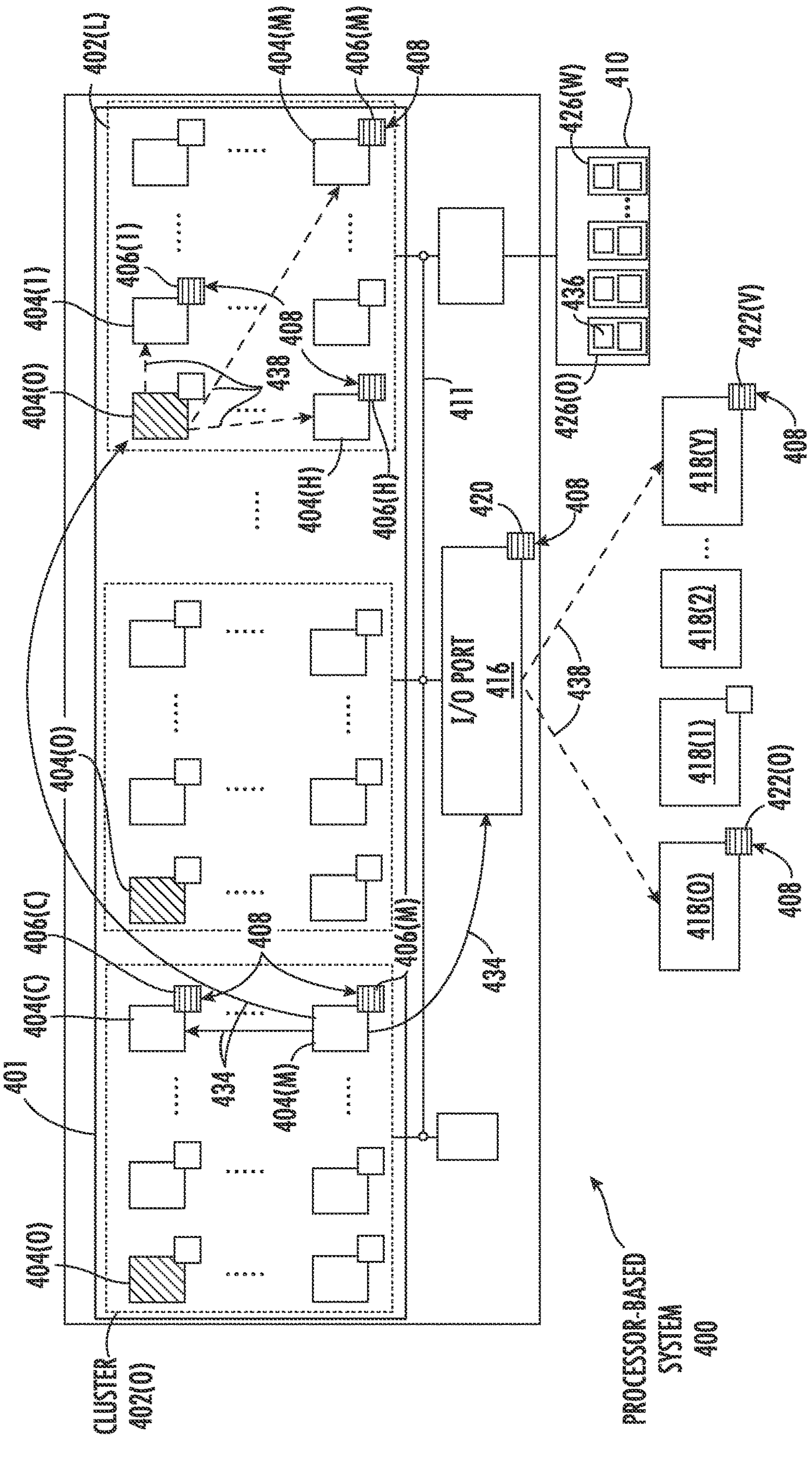
Figure 5:
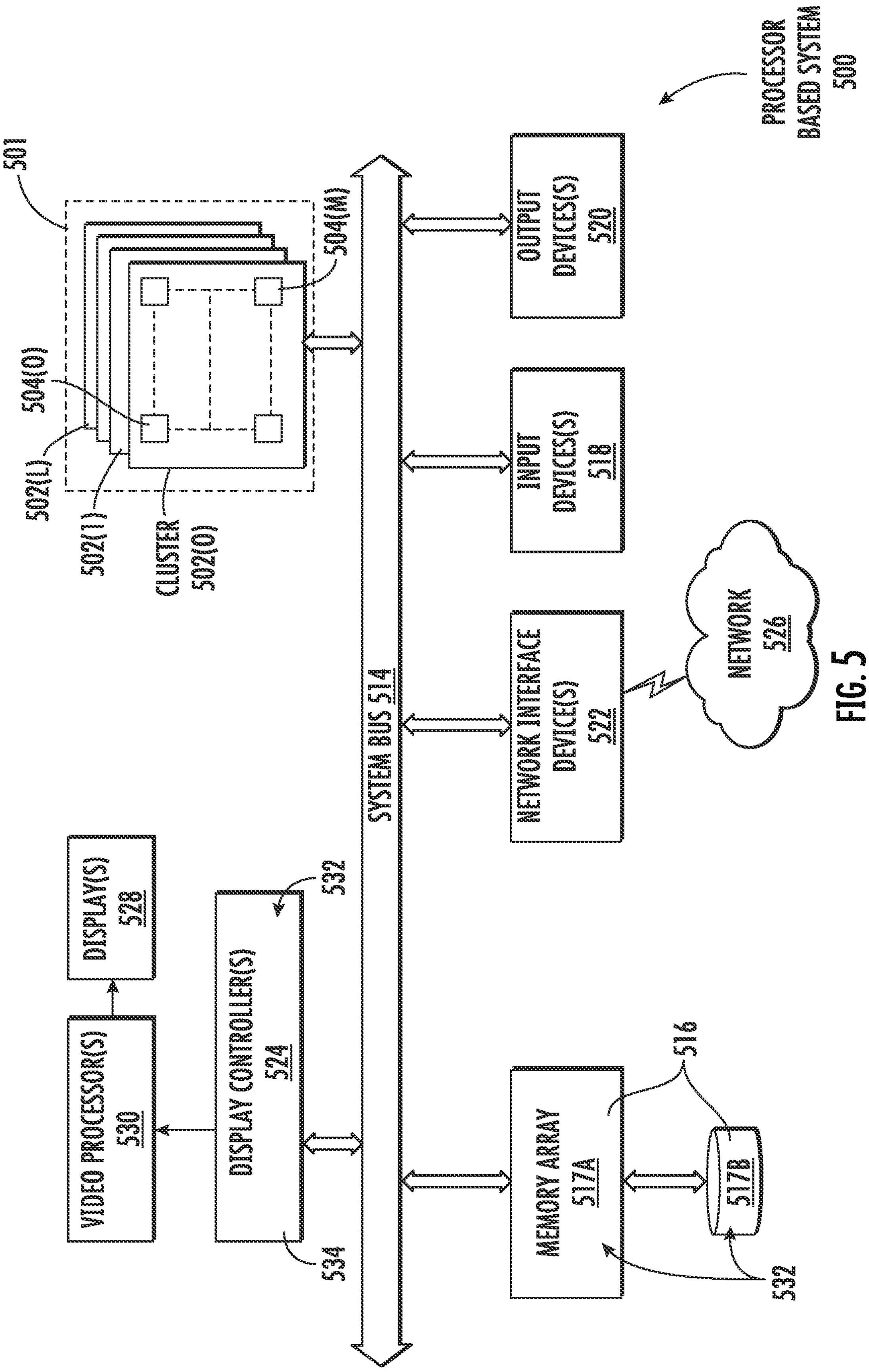

FIG. 4 is a schematic diagram of a second exemplary processor-based system in which a first core sends a message, without the assistance of a home core, to invalidate copies of a page table entry of a first VM in the core TLBs of cores allocated to a first set of cores in which at least one core is assigned to execute instructions of the first VM; and FIG. 5 is a block diagram of a computer system that includes a processor-based system in which a first core sends a message to invalidate copies of a page table entry of a first VM in the core TLBs of cores allocated to a first set of cores in which at least one core is assigned to execute instructions of the first VM.

DETAILED DESCRIPTION

Aspects disclosed herein include a multi-core processor-based system implementing directed page table entry invalidation. Related methods of directed invalidation of page table entries in a multi-core processor are also disclosed. The processor-based system includes multiple processor cores (cores) that may each include a core translation look-aside buffer (TLB) for storing copies of page table entries used for translating between virtual memory addresses of a virtual machine (VM) and physical memory addresses of a memory system. Each core is allocated to a set of cores. Copies of a same page table entry of a page table in the memory system may be stored in the core TLBs of cores that are assigned to execute at least one instruction of a first VM. In an exemplary aspect, a first core in the processor-based system is configured to obtain information that identifies cores in a first set of cores, where the information also indicates that at least one core of the first set of cores is assigned to execute instructions for the first VM. The first core sends a first message directed to the first set of cores to invalidate copies of a first page table entry of the first VM in the core TLBs of the first set of cores. In some examples, a message to invalidate copies of a page table entry may be sent in advance of modifying the page table entry of the first VM in the memory system. Employing a message directed to the first set of cores to invalidate copies of page table entries stored in the core TLBs of the first set of cores, instead of an invalidation message broadcast to all cores in the processor-based system, reduces communication traffic.

Figure 1:
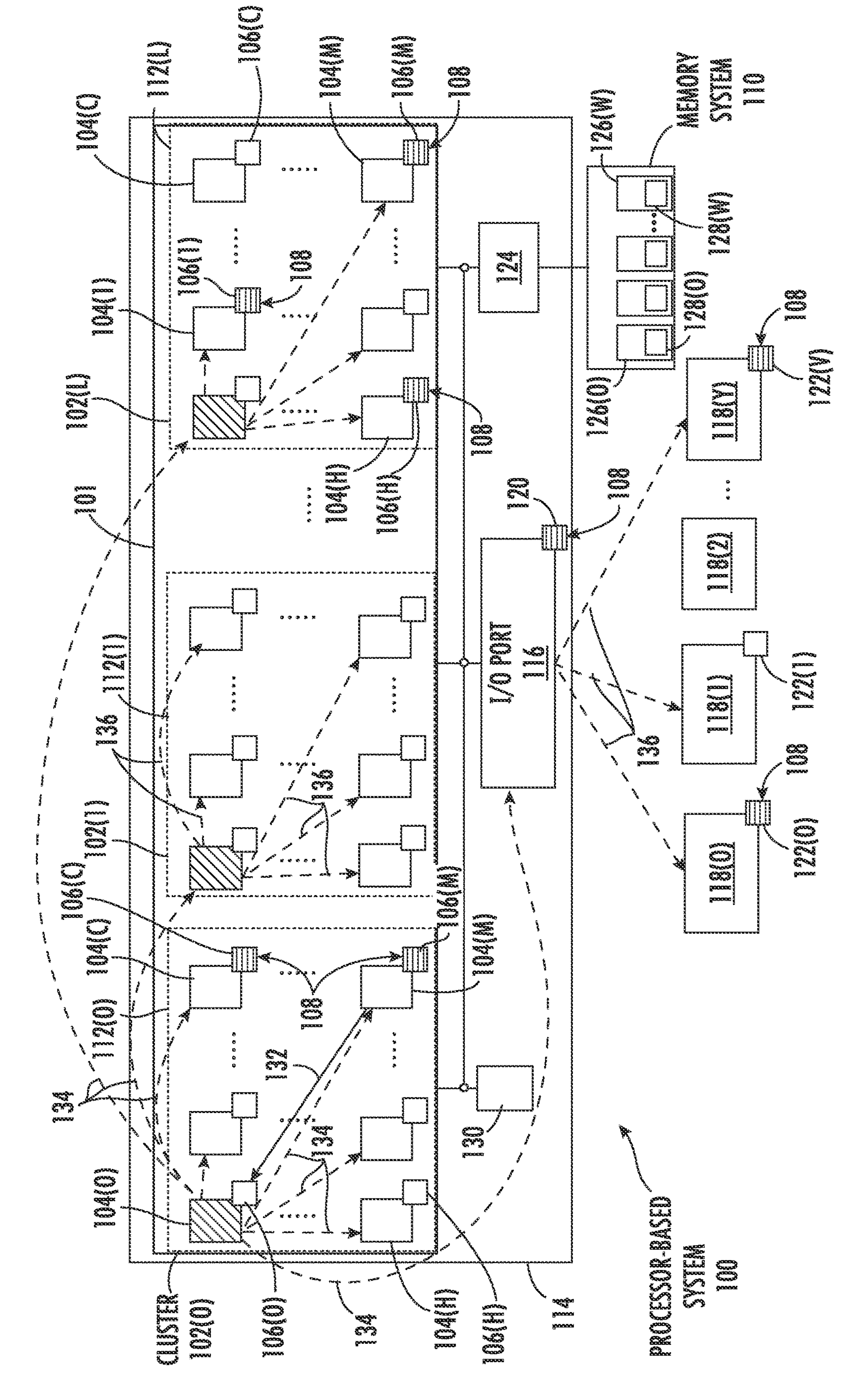
FIG. 1 is a schematic diagram of a processor-based system including clusters of cores in which each core includes a translation look-aside buffer (TLB), and one of the cores in each cluster is a home core that performs cluster management.

FIG. 1 is a schematic diagram of a processor-based system 100 having a processor 101 including clusters 102(0)-102(L) of processor cores (cores) 104(0)-104(M) and each of the cores 104(0)-104(M) includes one of core TLBs 106(0)-106(M). In this example, the core 104(0) of the cores 104(0)-104(M) in each of the clusters 102(0)-102(L) is referred to as a home core configured to perform cluster management operations, which may affect each core in the cluster. Each of the cores 104(0)-104(M) is configured to execute instructions of one VM of a plurality of VMs and store, in their associated core TLBs 106(0)-106(M), copies of page table entries that include translation information for translating between virtual addresses of the one VM and physical memory addresses.

In particular, in the example in FIG. 1, some of the core TLBs 106(0)-106(M) in some of the clusters 102(0)-102(L) store copies of a first page table entry 108 of a first VM. The copies of the first page table entry 108 each provide translation information for translating a first virtual memory address corresponding to a block of virtual memory to a memory address of a block of physical memory in a memory system 110 coupled to each of the cores 104(0)-104(M) in each of the clusters 102(0)-102(L), which share a same address translation regime.

In the example in FIG. 1, the clusters 102(0)-102(L) are disposed on separate integrated circuits (ICs) 112(0)-112(L), which may also be referred to as chips or chiplets, and the ICs 112(0)-112(L) are disposed on a substrate 114, which may be referred to as a package substrate or a carrier. The substrate 114 also includes an input/output (I/O) port 116 that supports multiple interfaces configured to communicatively couple the processor 101 to external devices 118(0)-118(Y). The I/O port 116 includes a port TLB 120, and some of the external devices 118(0)-118(Y) (i.e., 118(0), 118(1), and 118(Y)) include one of the device TLBs 122(0)-122(V), where V may be equal to or less than Y. For the external device 118(2), which does not include one of the device TLBs 122(0)-122(V), the port TLB 120 provides the function of the device TLBs 122(0)-122(V). For the external devices 118(0), 118(1), and 118(Y) that include the device TLBs 122(0)-122(V), the port TLB 120 provides a second level of caching for copies of page table entries, where the device TLBs 122(0)-122(V) provide a first level of caching in a hierarchy. Thus, the port TLB 120 and the device TLBs 122(0)-122(V) are configured to store copies of page table entries for virtual memory addresses of any virtual machines that are accessed by the external devices 118(0)-118(Y), including copies of the first page table entry 108. In this example, the external devices 118(0)-118(Y) also share the same address translation regime as the cores 104(0)-104(M) of the clusters 102(0)-102(L).

The substrate 114 also includes a memory control circuit 124 configured to couple each of the cores 104(0)-104(M) in each of the clusters 102(0)-102(L) to the memory system 110. The memory system 110 stores instructions and data processed in the processor-based system 100, as well as memory structures for managing virtual machines where multiple VMs may execute instructions on the cores 104 (0)-104(M) in each of the clusters 102(0)-102(L). In some examples, instructions of multiple VMs may execute in parallel (e.g., in a time-shared manner) on one of the cores 104(0)-104(M), and in other examples, instructions of one VM may be executed in parallel (e.g., simultaneously) on multiple ones of the cores 104(0)-104(M). The memory system 110 may also store information for managing the VMs, where such information is referred to herein as context information (context) 126(0)-126(W). Page tables 128(0)-128(W) of the VMs may be stored in or in association with the contexts 126(0)-126(W). The substrate 114 may also include a service processor 130 configured to perform system maintenance and configuration operations. Instructions of a hypervisor may be executed in the service processor 130 or in any of the cores 104(0)-104(M) of any of the clusters 102(0)-102(L), such as the home core 104(0) in the clusters 102(0)-102(L).

As instructions for a VM are executed, one of the cores 104(0)-104(M) in one of the clusters 102(0)-102(L) may need to update a virtual memory address that corresponds to a particular physical memory address in the memory system 110. Before executing an instruction to update the first page table entry 108 of the first VM in the memory system as part of a thread of instructions of the first VM, the core first executes an instruction to send a message to invalidate copies of the first page table entry 108 to ensure that existing translation information will no longer be used. Once the page table entry 108 in the memory system is updated, all previous copies of the first page table entry 108 stored in the core TLBs 106(0)-106(M) of the rest of the cores 104(0)-104(M) in the clusters 102(0)-102(L) become incorrect and would cause data errors if used. In the example in FIG. 1, copies of the first page table entry 108 are stored in the core TLB 106(C) of the core 104(C) in cluster 102(0) and, in cluster 102(L), in core TLB 106(1) of core 104(1), core TLB 106(H) of core 104(H), and core TLB 106(M) of core 104(M). In addition, copies of the first page table entry 108 are also stored in the port TLB 120 and the device TLBs 122(0) and 122(Y) of the external devices 118(0)-118(Y). Copies of the first page table entry 108 are not stored in the core TLB 106(H) of the core 104(H) in cluster 102(0), the core TLB 106(C) of the core 104(C) in the cluster 102(L), or the device TLB 122(1) of the external device 118(1), for example.

The outdated copies (not updated) of the first page table entry 108 stored in the rest of the cores 104(0)-104(M) in the clusters 102(0)-102(L) are invalidated, so they will no longer be used. This ensures that accesses to a virtual memory address of a VM are not incorrectly translated to different physical memory addresses. Because the local copies of the first page table entry 108 in the cores 104(0)-104(M) in the clusters 102(0)-102(L) are invalidated, the next time the virtual memory address translated by the first page table entry 108 is needed in any of the cores 104(0)-104(M), the updated first page table entry 108 will have to be read from the corresponding one of the page tables 128(0)-128(W) in the memory system 110. In some examples, the updated first page table entry 108 may be read from the one of the cores 104(0)-104(M) in the clusters 102(0)-102(L) that updated the first page table entry 108.

In the conventional processor-based system 100, before the core 104(M) of the cluster 102(0) modifies the first page table entry 108, the core 104(M) first invalidates all copies of the first page table entry 108 in the processor-based system 100. The core 104(M) of the cluster 102(0) broadcasts an invalidation message 132, which is transmitted to all of the cores 104(0)-104(M) in all of the clusters 102(0)-102 (L), as well as to the port 116 and the external devices 118(0)-118(Y), instructing them all to invalidate their respective copies of the first page table entry 108. In some examples, as shown in FIG. 1, broadcasting the invalidation message 132 includes sending the invalidation message 132 to the home core 104(0) of the cluster 102(0), where the invalidation message 132 includes an indication that it is to be broadcasted, and the home core 104(0) of the cluster 102(0) broadcasts a second message 134 to the home cores 104(0) of all the clusters 102(1)-102(L) and also to the core 104(H) of the cluster 102(0), instructing them to invalidate the first page table entry 108. The home cores 104(0) of all the clusters 102(0)-102(L) receive the invalidation message and broadcast third messages 136 to all of the cores 104(0)-104(M) in their respective clusters, such that every core 104(0)-104(M) in every cluster 102(0)-102(L) receives one of the invalidation messages 132, 134, and 136, whether their associated core TLBs 106(0)-106(M) contain a copy of the first page table entry 108 or not. In other examples, the core 104(M) of the cluster 102(0) issues a broadcast message directly to every core 104(0)-104(M) in all of the clusters 102(0)-102(L). Since many of the cores 104(0)-104 (M) in at least some of the clusters 102(0)-102(L) do not contain a copy of the first page table entry 108, many of the broadcasted invalidation messages 132, 134, and 136 are unneeded by their target and merely increase congestion in the processor-based system 100.

In addition, in response to the invalidation messages 132, 134, and 136, each of the cores 104(0)-104(M) in all of the clusters 102(0)-102(L), the port 116, and the external devices 118(0)-118(Y) respond to the invalidation messages 132, 134, and 136 with an acknowledgment message indicating receipt of the invalidation message. The number of messages and responses employed in this process for invalidating copies of page table entries occupies communication resources, creating bottlenecks within the processor-based system 100 each time a page table entry in the memory system is updated, causing periods of performance degradation with each occurrence.

In contrast, exemplary processor-based systems 200 and 400, described below with reference to FIGS. 2 and 4, avoid or reduce such bottlenecks by obtaining information that identifies the cores in a first set of cores and indicates that at least one of the cores in the first set of cores is assigned to execute, and then sending messages to invalidate copies of a first page table entry to the first set of cores. That is, in an exemplary aspect, to reduce communication bottlenecks created by broadcasting an invalidation message to all cores in all clusters, ports, and external devices, for example, the processor-based systems 200 and 400 may direct the invalidation messages in a targeted manner to only the cores, ports, and external devices that may have a copy of the particular page table entry that is about to be modified in the memory system. Components of the processor-based systems 200 and 400 in FIGS. 2 and 4 are configured similarly to related components of the conventional processor-based system 100 in FIG. 1, but such components differ in operation and structure at least with regard to the exemplary aspects disclosed herein.

Figure 2:
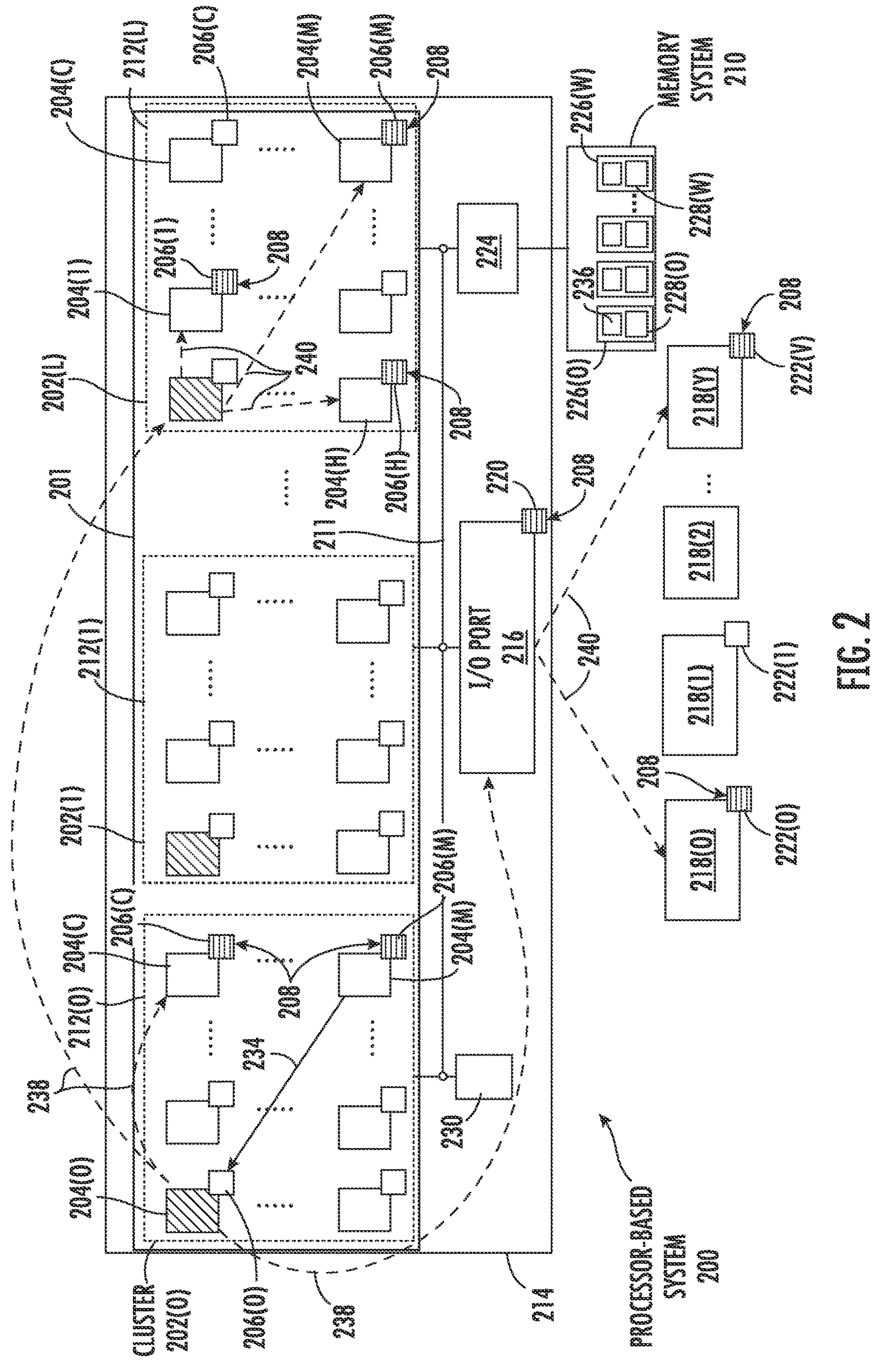
FIG. 2 is a schematic diagram of a first exemplary processor-based system in which a first core sends, by way of home cores in clusters of cores, a message to invalidate copies of a page table entry of a first virtual machine (VM) in the core TLBs of cores allocated to a first set of cores in which at least one core is assigned to execute instructions of the first VM.

FIG. 2 is a schematic diagram of a processor-based system 200 having a processor 201 including clusters 202 (0)-202(L) of processor cores (cores) 204(0)-204(M), and each of the cores 204(0)-204(M) includes one of core TLBs 206(0)-206(M). In this example, the cores 204(0) in each of the clusters 202(0)-202(L) may be referred to as a "home core" 204(0) configured to perform cluster management operations. In some examples, the clusters 202(0)-202(L) may not have designated home nodes. Each of the cores 204(0)-204(M) is configured to execute instructions of one or more virtual machines (VMs) and store, in their associated core TLBs 206(0)-206(M), copies of page table entries that include translation information for translating between virtual addresses of a VM and physical memory addresses. Thus, the core TLBs 206(0)-206(M) provide a function of caching copies of page table entries of the VMs being executed in the cores 204(0)-204(M). In this example, each of the clusters 202(0)-202(L) has a same number "M+1" of the cores 204(0)-204(M), but the processor-based system 200 is not limited in this regard as each of the clusters 202(0)-202(L) may each have any integer number of cores.

In particular, in the example in FIG. 2, some of the core TLBs 206(0)-206(M) in some of the clusters 202(0)-202(L) store copies of a first page table entry 208 of a first VM. The copies of the first page table entry 208 each provide translation information for translating a first virtual memory address corresponding to a block of virtual memory to a memory address of a block of physical memory in a memory system 210. The memory system 210 is coupled to each of the cores 204(0)-204(M) in each of the clusters 202(0)-202 (L), which may share a same address translation regime. The memory system 210 may include any appropriate type(s) of memory chips or circuits. The cores 204(0)-204(M) in each of the clusters 202(0)-202(L) are communicatively coupled to each other and to the memory system 210 by a system interface 211, which may include one or more mesh networks, system buses, and/or other multi-node interfaces.

In the example in FIG. 2, the clusters 202(0)-202(L) are disposed on separate integrated circuits (ICs) 212(0)-212(L), which may also be referred to as chips or chiplets, and are disposed on a substrate 214, which may be referred to as a package substrate or carrier. In alternative examples, the clusters 202(0)-202(L) may each be on a same IC, or there may be one or more of the clusters 202(0)-202(L) on each of several separate ICs disposed on separate substrates 214. The memory system 210 in this example may be external to the processor-based system 200, as shown, or may alternatively be included in the processor-based system 200 and disposed on the substrate 214.

The substrate 214 also includes an input/output (I/O) port 216 that is configured to support communication through one or more interfaces between the processor 201 and the external devices 218(0)-218(Y). The I/O port 216 includes a port TLB 220. Some of the external devices 218(0)-218(Y) may also include device TLBs 222(0)-222(V), where the number (V+1) of device TLBs 222(0)-222(V) may be equal to or less than the number (Y+1) of external devices 218 (0)-218(Y). For the external device 218(2), which does not include one of the device TLBs 222(0)-222(V), the port TLB 220 provides the function of the device TLBs 222(0)-222 (V). For the external devices 218(0), 218(1), and 218(Y) that include the device TLBs 222(0)-222(V), the port TLB 220 provides a second level of caching for copies of page table entries, where the device TLBs 222(0)-222(V) provide a first level of caching in a hierarchical manner. Thus, the port TLB 220 and the device TLBs 222(0)-222(V) are configured to store copies of page table entries for virtual memory addresses of any VMs that are accessed by the external devices 218(0)-218(Y), including copies of the first page table entry 208. In this example, the external devices 218 (0)-218(Y) may also share the same address translation regime as the cores 204(0)-204(M) of the clusters 202(0)-202(L).

The substrate 214 in FIG. 2 also includes a memory control circuit 224 configured to couple each of the cores 204(0)-204(M) in each of the clusters 202(0)-202(L) to the memory system 210. The memory system 210 stores instructions and data for access by the processor-based system 200, as well as memory structures for managing multiple VMs that may execute instructions on the cores 204(0)-204(M) in each of the clusters 202(0)-202(L). In some examples, instructions of multiple VMs may execute in parallel (e.g., in a time-shared manner) on one of the cores 204(0)-204(M), and in other examples, instructions of one VM may be executed in parallel (e.g., simultaneously) on multiple cores of the cores 204(0)-204(M) in one or more of the clusters 202(0)-202(L). The memory structures for managing a VM are referred to herein as context information (context) and the memory system 210 stores contexts 226(0)-226(W) for each of the VMs (where the number of VMs=W+1). Page tables 228(0)-228(W) of the VMs are stored in association with the contexts 226(0)-226(W). In the example in FIG. 2, the page tables 228(0)-228(W) are included in the contexts 226(0)-226(W).

The substrate 214 may also include a service processor 230. Instructions of a hypervisor or virtual machine monitor (VMM) may be executed by any of the cores 204(0)-204(M) of any of the clusters 202(0)-202(L), such as the home cores 204(0) in the clusters 202(0)-202(L), or in the service processor 230. The hypervisor or VMM includes instructions for managing the VMs and the assignment of the VMs for execution on certain ones of the cores 204(0)-204(M) of the clusters 202(0)-202(L). One aspect of managing the VMs includes establishing sets of cores in which one or more VMs may be executed. In some examples, the cores are associated with a set of cores at boot time, and may be based on topology of the processor-based system, such that all the cores that are assigned to execute instructions of a given VM may be the ones that are physically closer to a particular memory or other system component. For example, the cores 204(0)-204(M) in one of the clusters 202(0)-202 (L) may be identified as a set of cores. In such examples, the assignment of cores to a set of cores may remain static because the topology of the processor-based system will not change while it is running. In such examples, the hypervisor or VMM may assign all the cores in a set of cores to the same VM. Alternatively, the cores in one set of cores may be assigned to execute instructions of different VMs. In addition, the instructions of one VM may be assigned to cores in different sets of cores.

In some examples, cores may be assigned to a set of cores dynamically. In some examples in this regard, the cores assigned to execute instructions of a particular VM may define a set of cores, such that only cores in the set of cores execute instructions for that VM and all the cores in the set of cores execute instructions for the same VM.

In examples of an alternative to the dynamic assignment of cores to sets of cores described above, since the number of cores is limited, the number of sets of cores may also be limited. Thus, a number of VMs executed in the processor-based system 200 may exceed the number of sets of cores. In such examples, one or more cores of a set of cores may be assigned to execute instructions of a first VM while other cores in the same set of cores may be dynamically assigned to execute instructions of one or more other VMs. In addition, in such examples, cores of different sets of cores may be assigned to execute instructions of a same VM.

In the example illustrated in FIG. 2, which corresponds to the example in FIG. 1, a first VM executing in the core 204(M) in the cluster 202(0) may include an instruction to update a page table entry in the memory system, to change a virtual memory address that corresponds to a particular physical memory address in the memory system 210. Such instruction may be executed by a VM, a hypervisor, or a VM monitor (VMM) from any core or service processor in the processor-based system 200. In this regard, a change to the first page table entry 208 would render all copies of the first page table entry 208 stored in the core TLBs 206(0)-206(M) of the cores 204(0)-204(M) in the clusters 202(0)-202(L) incorrect. It should be understood that such an update instruction may be performed in any of the cores 204(0)-204(M) in any of the clusters 202(0)-202(L) or in the service processor 230. Before the core 204(M) of the cluster 202(0) updates the copy of the first page table entry 208 of the first VM in the memory system, the core 204(M) obtains first information 236 indicating that at least one core in a first set of cores 232 is assigned to execute instructions of the first VM. The information 236 also identifies cores in the first set of cores 232. In addition, the core 204(M) of the cluster 202(0) sends an invalidation message ("message") to invalidate the copies of the first page table entry 208 to prevent the cores executing instructions of the first VM from using an incorrect virtual to physical address translation.

In the example in FIG. 2, copies of the first page table entry 208 are stored in the first set of cores 232, which includes the core TLB 206(C) of the core 204(C) in cluster 202(0) and, in cluster 202(L), in core TLB 206(1) of core 204(1), core TLB 206(H) of core 204(H), and core TLB 206(M) of core 204(M). In this regard, it can also be seen in FIG. 2 that copies of the first page table entry 208 are stored in the port TLB 220 and the device TLBs 222(0) and 222(V) of the external devices 218(0) and 218(Y), respectively. Copies of the first page table entry 208 are not stored in the core TLB 206(H) of the core 204(H) in cluster 202(0), in the core TLB 206(C) of the core 204(C) in the cluster 202(L), or in the device TLB 222(1) of the external device 218(1), for example.

By obtaining the first information 236, the core 204(M) is able to identify the sets of cores that include cores that are assigned to execute instructions of the first VM, which is only the first set of cores 232 in this example. Then, the core 204(M) sends a first message 234 directed to the first set of cores 232 to invalidate the copies of the first page table entry 208 of the first VM in the core TLBs 206(0)-206(M) in the first set of cores 232. In the examples above, in which cores are assigned dynamically to execute instructions of a VM, the first set of cores 232 would only include cores assigned to execute instructions of the first VM and the first message 234 would only be directed to the cores in the first set of cores 232. In such example, only the cores that are assigned to execute instructions of a particular VM would receive the first message 234 invalidating a copy of the first page table entry 208.

In the examples above employing static assignment of cores to execute instructions of a VM, or in the alternative dynamic example, not all cores in a set of cores may be assigned to the same VM. However, the first message 234 may be directed to sets of cores, such that some of the cores that receive the first message 234 may not be assigned to the first VM but other cores of the same set would be assigned to the first VM and would invalidate their copies of the first page table entry 208, accordingly. The first message 234 would not be directed to sets of cores in which none of the cores are assigned to the first VM. In the example in FIG. 2, the first message 234 would not be directed to any of the cores in cluster 202(1)-202(L−1) that do not include any cores assigned to the first VM. In this regard, less traffic occurs on the system bus or network which may reduce or avoid bottlenecks.

Depending on the approach used for assignment of cores to VMs, the clusters 202(0)-202(L) may each be a set of cores, such that the cluster 202(0) comprises the first set of cores 204(0)-204(M) and the cluster 202(1) comprises a second set of cores 204(0)-204(M). In other examples, the cores including a copy of the first page table entry 208 in their respective core TLBs 206(0)-206(M) in FIG. 2 may be included in the first set of cores 236.

In the example in FIG. 2, the first message 234 is generated in the core 204(M) of the cluster 202(0) and is sent or transmitted over the system interface 211 to the home core 204(0) of the cluster 202(0) to be retransmitted. In some examples, the first message 234 includes a list of targets of the message, which identifies the cores in the first set of cores 232.

In this regard, the core 204(M) of the cluster 202(0) first obtains the information 236 that identifies the first set of cores 232 assigned to the first VM. The information 236 may be stored, for example, in the context 226(0) of the corresponding VM. Thus, the core 204(M) may obtain the information 236 from the context 226(0) of the VM associated with the first page table entry 208. In some examples, the information 236 may be stored in another memory location in the memory system 210 and managed by software, such as a hypervisor or operating system. In some examples, a snoop filter may be employed to generate and/or update the information 236. In some examples the information 236 may be stored in a storage circuit communicatively coupled to the plurality of cores 204(0)-204(M) in the clusters 202(0)-202(L).

In some examples, each of the home cores 204(0) of each of the clusters 202(0)-202(L) may keep and manage a copy of the information 236. To obtain the information 236, the core 204(M) of the cluster 202(0) may request the information 236 from the home core 204(0) or from a hypervisor or operating system. Alternatively, the core 204(M) may access the information 236 from the context 226(0) by a read operation.

In some examples, the core 204(M) of the cluster 202(0) send the first message 234 to the home core 204(0) without including the information 236. In such examples, the home core 204(0) may obtain the information 236 identifying the first set of cores 232. When the home core 204(0) of the cluster 202(0) receives the first message 234, the home core 204(0) may transmit second messages 238 targeted to the home cores 204(0) of any other clusters 202(0)-202(L) in which one of the cores 204(0)-204(M) has a copy of the first page table entry 208. In the example in FIG. 2, the home core 204(0) of the cluster 202(0) sends the second message 238 targeted to the home core 204(0) of the cluster 202(L). The home core 204(0) of the cluster 202(L) sends a third message 240 to the cores 204(1), 204(H), and 204(M) of the cluster 202(L). The home core 204(0) of the cluster 202(0) also sends the second message 238 to the core 204(H) of the cluster 202(0). In some examples, the home core 204(0) may transmit second messages 238 directly to (e.g., targeted to) all of the cores 204(0)-204(M) identified as having a copy of the first page table entry 208. In such examples, the home core 204(0) in the cluster 202(1) would not receive the first message 234 because none of the cores 204(0)-204(M) in the cluster 202(1) are assigned to the first VM.

In some examples, the information 236 may also identify the port 216 and at least one of the external devices 218(0)-218(Y) as having copies of the first page table entry 208. Thus, in addition to the list of cores that may store a copy of the first page table entry 208, the information 236 may also include a list of other entities, including the port 216 and any of the external devices 218(0)-218(Y) that are accessing the virtual memory space of the first VM and, therefore, may store a copy of the first page table entry 208. In the example in FIG. 2, the external devices 218(0) and 218(Y) have copies of the first page table entry 208. Thus, the home core 204(0) of the cluster 202(0) sends the second message 238 to the port 216 and the port 216 sends the third message 240 to the external devices 218(0) and 218(Y). Each of the first set of cores 232, the port 216, and the external devices 218(0) and 218(Y) respond with acknowledgments of the received messages 238 and 240. The combination of messages 234, 238, and 240 described above creates a limited amount of message traffic on the system interface 211, which may be a significant reduction compared to the broadcasted invalidation messages 132, 134, and 136 in FIG. 1. The reduction in traffic on the system interface 211 avoids communication bottlenecks that may have otherwise been caused and, thereby, improves overall system performance.

In some examples, the home core 204(0) of the cluster 202(0) may be responsible for scheduling execution of instructions of a VM in the core 204(M). In response to scheduling execution of at least one instruction that will access the first page table entry 208, such that the core 204(M) will store a copy of the first page table entry 208, the home core 204(0) may update the information 236 identifying the first set of cores 232 to include the core 204(M). In some examples, a hypervisor executed in a service processor may schedule execution of a VM in any of the cores 204(0)-204(M) and may update the information 236 to identifying the core 204(M) as being in the first set of cores 232.

The examples above describe the first message 234 being managed or handled by home cores 204(0) of each of the cluster 202(0)-202(M) for either transmitting the first message 234 from one of the cores in their cluster or receiving and possibly forwarding the first message 234 to cores in their cluster that are in the first set of cores 232. In other examples, whether home cores are employed in the clusters 202(0)-202(L) or not, the first message 234 may be sent directly from the first core 204(M) (in the above example) to the cores in the first set of cores 232 because one or more of the cores in the first set of cores 232 is assigned to execute instructions of the first VM. The first message 234 may include destination, target, or receiver information that may be used by a mesh or routing hardware to direct the first message 234 to only the designated sets of cores.

It should be noted that the numerical identifiers C, H, L, M, V, W, and Y used above may range from zero (0) to any appropriate positive integer number.

Figure 3:
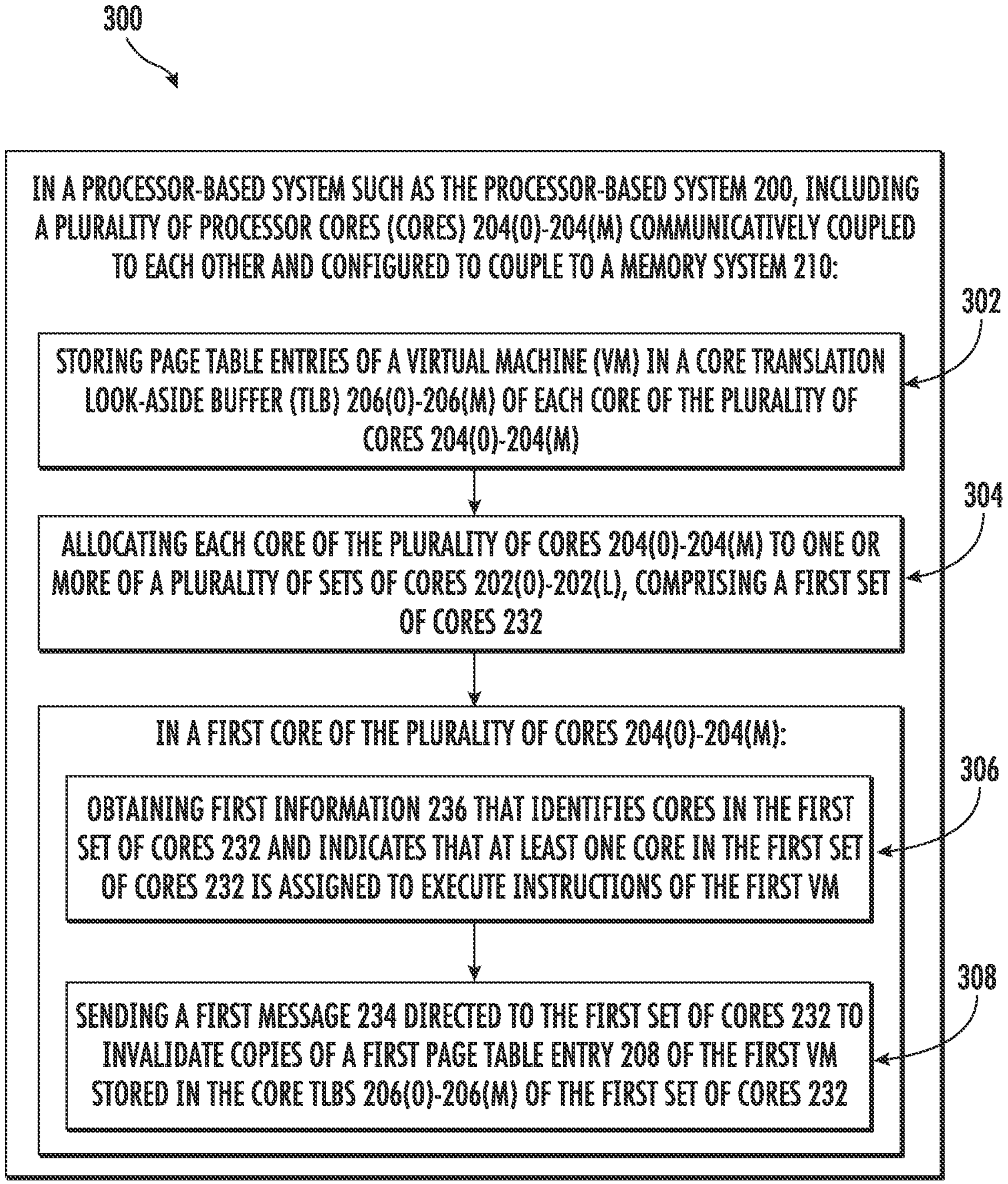
FIG. 3 is a flow chart of an exemplary process in a processor-based system such as the processor-based system in FIG. 2, including a first core sending a message to invalidate copies of a page table entry of a first VM in the core TLBs of cores allocated to a first set of cores in which at least one core is assigned to execute instructions of the first VM.

FIG. 3 is a flow chart of an exemplary process 300 in a processor-based system such as the processor-based system 200 in FIG. 2, including a plurality of processor cores (cores) 204(0)-204(M) communicatively coupled to each other and configured to couple to a memory system 210, the method comprising, storing page table entries of a virtual machine (VM) in a core translation look-aside buffer (TLB) 206(0)-206(M) of each core of the plurality of cores 204 (0)-204(M) (block 302), and allocating each core of the plurality of cores 204(0)-204(M) to one or more of a plurality of sets of cores, comprising a first set of cores 232 (block 304). The method further includes, in a first core of the plurality of cores 204(0)-204(M), obtaining first information 236 that identifies cores in the first set of cores 232 and indicates that at least one core in the first set of cores 232 is assigned to execute instructions of the first VM (block 306) and sending a first message 234 directed to the first set of cores 232 to invalidate copies of a first page table entry 208 of the first VM stored in the core TLBs 206(0)-206(M) of the first set of cores 232 (block 308).

FIG. 4 is a schematic diagram of a second exemplary processor-based system 400 in which a message for invalidating a copy of a page table entry of a first VM stored in the TLBs of other cores is sent to other cores in the same cluster and to home cores of other clusters comprising the cores with copies of the first page table entry. The processor-based system 400 has a processor 401 that includes clusters 402(0)-402(L) of cores 404(0)-404(M), and each of the cores 404(0)-404(M) includes one of core TLBs 406(0)-406 (M). The processor-based system 400 corresponds to the processor-based system 200, except with regard to exemplary aspects of invalidating copies of a first page table entry 408. The processor-based system 400 includes a memory system 410 coupled to the clusters 402(0)-402(L) of cores 404(0)-404(M) by a system interface 411.

FIG. 4 is provided to illustrate at least one alternative example of sending a targeted first message 434. The example in FIG. 4 is consistent with the example in FIG. 2 regarding the locations where copies of the first page table entry 408 are stored. As shown, the copies of the first page table entry 408 are stored in a first set of cores 432 (not labeled in FIG. 4), including the core TLBs 406(C) and 406(M) of the cores 404(C) and 404(M) in the cluster 402(0), and the cores 404(1), 404(H), and 404(M) in the cluster 402(L). The copies of the first page table entry 408 are also stored in a port TLB 420 of an I/O port 416 and device TLBs 422(0) and 422(V) of external devices 418(0) and 418(Y).

In short, the example illustrated in FIG. 4 primarily differs from the example in FIG. 2 because the core 404(M) in the cluster 402(0) does not rely on the home core 404(0) in the cluster 402(0) to forward the invalidation message and, instead, sends the message directly to sets (identified here as cluster 402(0) and 402(L)) that include cores assigned to the first VM.

In the example in FIG. 4, the core 404(M) in the cluster 402(0) obtains information 436 that identifies cores in the first set of cores 432 (e.g., cores 404(0)-404(M) in cluster 402(0)) and indicates that at least one core in the first set of cores 432 is assigned to execute instructions of the first VM. The core 404(M) may obtain the information 436 from the memory system 410, such as in contexts 426(0)-426(W).

In contrast to the description referring to FIG. 2, rather than sending the first message 434 to the home core 404(0) of the same cluster 402(0), the first message 434 identifies, in a destination field, for example, the core 404(C) of the same cluster 402(0), which is in the first set of cores 432, as a target of the targeted first message 434. The first message 434 also identifies home core 404(0) of the cluster 402(L) as a target of the targeted first message 434 because cluster 402(L) includes cores 404(1), 404(H), and 404(M) that each have a copy of the first page table entry 408.

In this regard, the first message 434 may be sent as a multi-cast instruction with multiple specified destinations or targets. In response to receiving the targeted first message 434, the home core 404(0) of the cluster 402(L) sends a targeted second message 438 to the cores 404(1), 404(H), and 404(M). In some examples, the core 404(M) of the cluster 402(0) may send the targeted first message 434 directly to the cores 404(1), 404(H), and 404(M), rather than to the home core 404(0). In some examples, in response to determining that a number of cores in the first set of cores 432 exceeds a first threshold, the first message 434 may be broadcast to all cores in the processor-based system 400. In some examples, in response to determining a number of cores in the first set of cores 432 is less than a second threshold, the first message 434 may be sent as separate messages to each core in the system that is identified, by the first information 436, as being assigned to the first VM.

In some examples, the core 404(0) may send the targeted first message 434 to the home core 404(0) of appropriate clusters, including the home core 404(0) of the cluster 402(0), rather than sending the targeted first message 434 directly to the core 404(C). In some examples, the core 404(M) of the cluster 402(0) may send the targeted first message 434 to the I/O port 416 such that a targeted second message 438 may be transmitted to the external devices 418(0) and 418(Y). In some examples, the home core 404(M) of the cluster 402(0) may send the targeted first message 434 directly to the I/O port 416 and directly to the external devices 418(0) and 418(Y).

FIG. 5 illustrates an example of a processor-based system 500, including a multi-core processor 501 ("processor 501") that may be the same as or similar to the processor-based system 200 in FIG. 2 and the processor 400 in FIG. 4, including clusters 502(0)-502(L), which each include cores 504(0)-504(M) (where L and M are any positive integer number) that, in response to modifying a copy of a page table entry, generate a targeted message to invalidate the copies of the same page table entry stored in other cores of the processor-based system to avoid a broadcasted message that creates communication bottlenecks. The clusters 502(0)-502(L) may be coupled to a system bus 514 (system interface) that is further coupled to a system memory 516 comprising a memory array 517A and a magnetic disk drive 517B.

Other initiator and target devices can be connected to the system bus 514 of the processor-based system 500. As illustrated in FIG. 5, these devices can include one or more input devices 518, one or more output devices 520, one or more network interface devices 522, and one or more display controllers 524, as examples. The input device(s) 518 can include any type of input device, including, but not limited to, input keys, switches, voice processors, etc. The output device(s) 520 can include any type of output device, including, but not limited to, audio, video, other visual indicators, etc. The network interface device(s) 522 can be any device configured to allow the exchange of data to and from a network 526. The network 526 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 522 can be configured to support any type of communications protocol desired.

The processor 501 may also be configured to access the display controller(s) 524 over the system bus 514 to control information sent to one or more displays 528. The display controller(s) 524 sends information to the display(s) 528 to be displayed via one or more video processors 530, which process the information to be displayed into a format suitable for the display(s) 528. The display(s) 528 can include any type of display, including, but not limited to, a cathode ray tube (CRT), a liquid crystal display (LCD), a plasma display, a light emitting diode (LED) display, etc. The processor 501, the system memory 516, the network 526, the input devices 518, and/or the display controller 524 can include computer instructions 532 in non-transitory computer-readable media 534 to control their respective functions.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The initiator devices and target devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of non-transitory computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A processor-based system, comprising a plurality of processor cores (cores) communicatively coupled to each other, and configured to couple to a memory system, wherein:

each core of the plurality of cores comprises a core translation look-aside buffer (TLB) configured to store copies of page table entries of a virtual machine (VM);

each core of the plurality of cores is allocated to one or more of a plurality of sets of cores comprising a first set of cores; and a first core of the plurality of cores is configured to:

obtain first information that identifies cores in the first set of cores and indicates that at least one core in the first set of cores is assigned to execute instructions of a first VM; and send a first message directed to the first set of cores to invalidate copies of a first page table entry of the first VM in the core TLBs in the first set of cores.

2. The processor-based system of claim 1, wherein the first information further indicates that instructions of the first VM are only executed in the first set of cores.

3. The processor-based system of claim 1, wherein the first message is directed to only the first set of cores.

4. The processor-based system of claim 1, further comprising a third set of cores, wherein:

the first information further indicates that at least one core in the third set of cores is assigned to execute instructions of the first VM; and the first message is also directed to the third set of cores.

5. The processor-based system of claim 4, wherein:

the plurality of sets of cores further comprises a second set of cores;

the first information further indicates that no core in the second set of cores is assigned to execute instructions of the first VM; and the first message is not directed to the second set of cores.

6. The processor-based system of claim 1, the first information further indicating that at least one core in the first set of cores is assigned to execute instructions of a second VM.

7. The processor-based system of claim 1, wherein:

the plurality of cores is disposed in clusters; and the first set of cores comprises cores of a first cluster.

8. The processor-based system of claim 7, wherein the first set of cores consists of cores in the first cluster.

9. The processor-based system of claim 8, wherein the first set of cores comprises all the cores in the first cluster.

10. The processor-based system of claim 7, wherein the first set of cores further comprises cores of a second cluster.

11. The processor-based system of claim 1, wherein the first core is further configured to read the first information from a data structure in the memory system.

12. The processor-based system of claim 1, wherein the first core is further configured to read the first information from a storage circuit coupled to the plurality of cores.

13. The processor-based system of claim 1, wherein the first core is further configured to:

receive acknowledgements of the first message from each core in the first set of cores; and in response to receiving the acknowledgements, update the first page table entry in a page table in the memory system.

14. The processor-based system of claim 1, wherein a core of the plurality of cores is configured to update the first information in response to instructions of a hypervisor or a second VM assigned to a core in the first set of cores.

15. The processor-based system of claim 1, wherein:

the plurality of cores is disposed in one or more clusters of cores;

each cluster of the one or more clusters of cores comprises a home core configured to execute instructions affecting all cores in the cluster;

the first core is configured to transmit the first message to the home core of each one of the one or more clusters comprising at least one core of the first set of cores; and the home core of each one of the one or more clusters forwards the first message to the cores in the cluster.

16. The processor-based system of claim 15, wherein the home core of each one of the one or more clusters is configured to determine the one or more cores of the first set of cores in the corresponding cluster from the first message.

17. The processor-based system of claim 1, wherein the first core is further configured to:

in response to determining that a number of cores in the first set of cores exceeds a first threshold, broadcast a targeted first message to the plurality of cores in the processor-based system.

18. The processor-based system of claim 1, wherein the first core is further configured to:

in response to determining that a number of cores in the first set of cores is less than a second threshold, send the first message multiple times, once to each core of the first set of cores.

19. The processor-based system of claim 1, wherein the first core is further configured to generate the first message identifying each of the cores in the first set of cores as targets of the first message.

20. The processor-based system of claim 1, further comprising an input/output (I/O) port communicatively coupled to the plurality of cores and comprising a port TLB configured to store copies of page table entries of a VM, wherein:

the first information indicates that the port TLB stores a copy of at least one page table entry of the first VM; and the first core is further configured to send the first message to the I/O port to invalidate the copy of the first page table entry in the port TLB.

21. The processor-based system of claim 20, wherein:

the I/O port is configured to couple to at least one external device comprising a device TLB configured to store copies of page table entries of a VM;

the first information indicates that a first external device of the at least one external device is assigned to execute instructions of the first VM; and the first core is further configured to send the first message to the external device.

22. A method in a processor-based system comprising a plurality of processor cores (cores) communicatively coupled to each other and configured to couple to a memory system, the method comprising:

storing page table entries of a virtual machine (VM) in a core translation look-aside buffer (TLB) of each core of the plurality of cores;

allocating each core of the plurality of cores to one or more of a plurality of sets of cores, comprising a first set of cores; and in a first core of the plurality of cores:

obtaining first information that identifies cores in the first set of cores and indicates that at least one core in the first set of cores is assigned to execute instructions of a first VM; and sending a first message directed to the first set of cores to invalidate copies of a first page table entry of the first VM stored in the core TLBs of the first set of cores.

23. The method of claim 22, further comprising directing the first message to only the first set of cores.

24. The method of claim 22, further comprising:

indicating, in the first information, that at least one core in a third set of cores is assigned to execute instructions of the first VM; and directing a targeted first message to the at least one core in the third set of cores.

25. The method of claim 22, further comprising:

assigning only cores in the first set of cores to execute instructions of the first VM; and directing the first message to only the first set of cores.

26. The method of claim 22, further comprising assigning at least one of the cores in the first set of cores to execute instructions of a second VM.

27. The method of claim 22, wherein obtaining the first information further comprises reading the first information from a data structure in the memory system.

28. The method of claim 22, wherein obtaining the first information further comprises reading the first information from a storage circuit coupled to the plurality of cores.

29. A non-transitory computer-readable medium comprising instructions which, when executed in a processor-based system comprising a plurality of processor cores (cores) communicatively coupled to each other and configured to couple to a memory system, control the processor-based system to:

store page table entries of a virtual machine (VM) in a core translation look-aside buffer (TLB) of each core of the plurality of cores;

allocate each core of the plurality of cores to one or more of a plurality of sets of cores, comprising a first set of cores; and in a first core of the plurality of cores:

obtain first information identifying cores in the first set of cores and indicating that at least one core in the first set of cores is assigned to execute instructions of a first VM; and send a first message directed to the first set of cores to invalidate copies of a first page table entry of the first VM stored in the core TLBs of the first set of cores.

* * * * *